(12) United States Patent
Hauser et al.

(10) Patent No.: US 11,673,324 B2
(45) Date of Patent: Jun. 13, 2023

(54) NOZZLE FOR 3D BIOPRINTING

(71) Applicant: KING ABDULLAH UNIVERSITY OF SCIENCE AND TECHNOLOGY, Thuwal (SA)

(72) Inventors: Charlotte A. E. Hauser, Thuwal (SA); Zainab Khan, Thuwal (SA); Kowther Kahin, Thuwal (SA); Dana Alhattab, Thuwal (SA)

(73) Assignee: King Abdullah University of Science and Technology, Thuwal (SA)

( * ) Notice: Subject to any disclaimer, the term of this patent is extended or adjusted under 35 U.S.C. 154(b) by 0 days.

(21) Appl. No.: 17/401,800

(22) Filed: Aug. 13, 2021

(65) Prior Publication Data
US 2022/0055297 A1 Feb. 24, 2022

Related U.S. Application Data

(60) Provisional application No. 63/067,913, filed on Aug. 20, 2020, provisional application No. 63/067,958, filed on Aug. 20, 2020.

(51) Int. Cl.
*B29C 64/209* (2017.01)
*B33Y 30/00* (2015.01)
(Continued)

(52) U.S. Cl.
CPC .......... *B29C 64/209* (2017.08); *B29C 64/336* (2017.08); *B33Y 30/00* (2014.12); *B33Y 70/00* (2014.12); *B29K 2077/00* (2013.01)

(58) Field of Classification Search
CPC ...... B29C 64/209; B29C 64/336; B33Y 30/00
See application file for complete search history.

(56) References Cited

U.S. PATENT DOCUMENTS

| 5,445,612 A | 8/1995 | Terakura et al. |
| 8,729,032 B2 | 5/2014 | Nagai et al. |

(Continued)

FOREIGN PATENT DOCUMENTS

| CN | 105085622 A | 11/2015 |
| CN | 109224654 A | 1/2019 |

(Continued)

OTHER PUBLICATIONS

Huebsch, N.; Arany, P. R.; Mao, A. S.; Shvartsman, D.; Ali, O. A.; Bencherif, S. A.; Rivera-Feliciano, J.; Mooney, D. J. Harnessing traction-mediated manipulation of the cell/matrix interface to control stem-cell fate. Nat. Mater. 2010, 9, 518.

(Continued)

*Primary Examiner* — Joseph S Del Sole
*Assistant Examiner* — Mohamed K Ahmed Ali
(74) *Attorney, Agent, or Firm* — Ajay A. Jagtiani; Miles & Stockbridge P.C.

(57) ABSTRACT

The present disclosure relates to a coaxial nozzle for building a 3D tissue model. Accordingly, a nozzle for 3D tissue bioprinting may include at least one buffer solution inlet, at least one peptide inlet, at least one cell inlet, and a mixing chamber. The least one buffer solution inlet is attached to the at least one peptide inlet. The at least one cell inlet is attached to the at least one peptide inlet. The at least one buffer solution inlet may be attached from a side of the at least one peptide inlet, and the at least one cell inlet may be disposed externally and attached at an angle to the at least one peptide inlet.

21 Claims, 4 Drawing Sheets
(4 of 4 Drawing Sheet(s) Filed in Color)

(51) Int. Cl.
 *B29C 64/336* (2017.01)
 *B33Y 70/00* (2020.01)
 *B29K 77/00* (2006.01)

(56) References Cited

U.S. PATENT DOCUMENTS

| | | | |
|---|---|---|---|
| 10,537,828 | B2 | 1/2020 | Baxter et al. |
| 2011/0113053 | A1 | 5/2011 | Khan et al. |
| 2013/0023460 | A1 | 1/2013 | Hauser et al. |
| 2014/0349933 | A1 | 11/2014 | Hauser et al. |
| 2015/0038428 | A1 | 2/2015 | Hauser et al. |
| 2016/0136895 | A1 | 5/2016 | Beyer et al. |
| 2016/0288414 | A1* | 10/2016 | Ozbolat ............... A61F 2/2875 |
| 2016/0375177 | A1 | 12/2016 | Hauser et al. |
| 2017/0296760 | A1 | 10/2017 | Lee et al. |
| 2018/0030501 | A1 | 2/2018 | Bourdeau et al. |
| 2018/0361025 | A1 | 12/2018 | Lancaster et al. |
| 2019/0219572 | A1 | 7/2019 | Mehra et al. |
| 2019/0321291 | A1 | 10/2019 | Connolly et al. |
| 2020/0148720 | A1 | 5/2020 | Hauser et al. |
| 2020/0199514 | A1 | 6/2020 | Hauser et al. |
| 2020/0247046 | A1 | 8/2020 | Malaquin et al. |
| 2021/0114276 | A1* | 4/2021 | Nelson ................. B29C 48/912 |
| 2021/0121639 | A1* | 4/2021 | Miri Ramsheh ........ B29C 48/16 |

FOREIGN PATENT DOCUMENTS

| | | | |
|---|---|---|---|
| CN | 111172100 A | 5/2020 | |
| EP | 0 723 646 B1 | 7/1996 | |
| JP | 2005-028216 A | 2/2005 | |
| JP | 2013-009598 A | 1/2013 | |
| JP | 2013009598 A | 1/2013 | |
| JP | 2015-13850 A | 1/2015 | |
| JP | 2016-79190 A | 5/2016 | |
| JP | 2016-530874 A | 10/2016 | |
| JP | 2017-501136 A | 1/2017 | |
| JP | 2017501136 A | 1/2017 | |
| JP | 2020-519605 A | 7/2020 | |
| JP | 2002-320815 A | 11/2020 | |
| KR | 10-1596014 B1 | 2/2016 | |
| WO | 2014/104981 A1 | 7/2014 | |
| WO | 2014/186581 A1 | 11/2014 | |
| WO | 2014/197999 A1 | 12/2014 | |
| WO | 2015/066705 A1 | 5/2015 | |
| WO | 2015/080670 A9 | 6/2015 | |
| WO | 2015/080671 A1 | 6/2015 | |
| WO | 2016/123693 A1 | 8/2016 | |
| WO | 2016/144259 A1 | 9/2016 | |
| WO | 2017/089963 A1 | 6/2017 | |
| WO | 2018/207036 A1 | 11/2018 | |
| WO | 2018/207037 A1 | 11/2018 | |
| WO | WO-2018207037 A1 * | 11/2018 | ............. A61L 27/22 |
| WO | 2020/162835 A1 | 8/2020 | |

OTHER PUBLICATIONS

Kabiri, K.; Omidian, H.; Hashemi, S.; Zohuriaan-Mehr, M. Synthesis of fast-swelling superabsorbent hydrogels: effect of crosslinker type and concentration on porosity and absorption rate. Eur. Polym. J. 2003, 39, 1341-1348.

Hale, B. W.; Goodrich, L. R.; Frisbie, D. D.; McIlwraith, C. W.; Kisiday, J. D. Effect of scaffold dilution on migration of mesenchymal stem cells from fibrin hydrogels. Am. J. Vet. Res. 2012, 73, 313-318.

Cuchiara, M. P.; Allen, A. C.; Chen, T. M.; Miller, J. S.; West, J. L. Multilayer microfluidic PEGDA hydrogels. Biomaterials 2010, 31, 5491-5497.

Cheng, R.; Yan, Y.; Liu, H.; Chen, H.; Pan, G.; Deng, L.; Cui, W. Mechanically enhanced lipo-hydrogel with controlled release of multi-type drugs for bone regeneration. Appl. Mater. Today 2018, 12, 294-308.

Engler, A. J.; Sen, S.; Sweeney, H. L.; Discher, D. E. Matrix elasticity directs stem cell lineage specification. Cell 2006, 126, 677-689.

Sivaraj, K. K.; Adams, R. H. Blood vessel formation and function in bone. Development 2016, 143, 2706-2715.

Kim, S.; Cha, C. Enhanced mechanical and electrical properties of heteroscaled hydrogels infused with aqueous-dispersible hybrid nanofibers. Biofabrication 2020, 12, No. 015020.

Hwang, T. L.; Shaka, A. J., Water Suppression That Works. Excitation Sculpting Using Arbitrary Wave-Forms and Pulsed-Field Gradients. J. Magn. Reson. 1995, 112, (2), 275-279.

Derome, A. E.; Williamson, M. P., Rapid-Pulsing Artifacts in Double-Quantum-Filtered COSY. J. Magn. Reson. 1990, 88, (1), 177-185.

Piotto, M.; Saudek, V.; Sklenaf, V., Gradient-Tailored Excitation for Single-Quantum NMR Spectroscopy of Aqueous Solutions. J. Biomol. NMR 1992, 2, (6), 661-665.

Sklenar, V.; Piotto, M.; Leppik, R.; Saudek, V., Gradient-Tailored Water Suppression for 1H-15N HSQC Experiments Optimized to Retain Full Sensitivity. J. Magn. Reson. 1993, 102, (2), 241-245.

Gilbert, D. F.; Erdmann, G.; Zhang, X.; Fritzsche, A.; Demir, K.; Jaedicke, A.; Muehlenberg, K.; Wanker, E. E.; Boutros, M., A novel multiplex cell viability assay for high-throughput RNAi screening. PloS One 2011, 6, (12), e28338.

Arab, "Novel Nanofibrous Peptide Scaffolds for Tissue Regeneration", Dissertation, King Abdullah University of Science and Technology, Thuwal, Saudi Arabia, Apr. 2019.

Ikeno et al., "Effects of self-assembling peptide hydrogel scaffold on bone regeneration with recombinant human bone morphogenetic protein-2"; The International Journal of Oral and Maxillofacial Implants; vol. 28, No. 5, pp. e283-289 (2013).

Liu et al., "Stiffness-mediated mesenchymal stem cell fate decision in 3D-bioprinted hydrogels"; Burns & Trauma, vol. 8, pp. 1-13 (2020).

International Search Report and Written Opinion received in International Application No. PCT/IB2021/057623 dated Dec. 13, 2021.

International Search Report and Written Opinion received in PCT Application No. PCT/IB2021/057625 dated Dec. 14, 2021.

International Search Report and Written Opinion received in PCT Application No. PCT/IB2021/057624 dated Dec. 13, 2021.

International Search Report and Written Opinion received in PCT Application No. PCT/IB2021/057623 dated Dec. 13, 2021.

International Search Report and Written Opinion received in PCT Application No. PCT/IB2021/057996 dated Dec. 20, 2021.

International Search Report and Written Opinion received in PCT Application No. PCT/IB2021/057973 dated Dec. 20, 2021.

International Search Report and Written Opinion received in PCT Application No. PCT/IB2021/059652 dated Feb. 3, 2022.

Cembran et al., "Biomimetic Materials and Their Utility in Modeling the 3-Dimensional Neural Environment", iScience, vol. 23, pp. 1-16 (2020).

Cunha et al., "3D Culture of adult mouse neural stem cells within functionalized self-assembling peptide scaffolds", International Journal of Nanomedicine, vol. 6, pp. 943-955 (2011).

Marchini et al., "Multi-Functionalized Self-Assembling Peptides as Reproducible 3D Cell Culture Systems Enabling Differentiation and Survival of Various Human Neural Stem Cell Lines", frontiers in Neuroscience, vol. 14, Article 413, pp. 1-11 (2020).

Ranjan et al., "A microfiber scaffold-based 3D in vitro human neuronal culture model of Alzheimer's disease", The Royal Society of Chemistry, vol. 8, pp. 4861-4874 (2020).

Zhang et al., "Compatability of neural stem cells with functionalized self-assembling peptide scaffold in vitro", Biotechnology and Bioprocess Engineering, vol. 15, pp. 545-551 (2010).

Arab, "Novel Nanofibrous Peptide Scaffolds for Tissue Regeneration", PhD Thesis, Kind Abdullah University of Science and Technology, pp. 1-131 (2019).

Ikeno et al., "Effects of self-assembling peptide hydrogel scaffold on bone regeneration with recombinant human bone morphogenetic protein-2", The International Journal of Oral and Maxillofacial Implants, vol. 28, No. 5, pp. 283-289 (2013).

Liu et al., "Stiffness-mediated mesenchymal stem cell fate decision in 3D-bioprinted hydrogels", Burns and Trauma, vol. 8, pp. 1-13(2020).

Sundararajan et al., "Use of cyanobacterial gas vesicles as oxygen carriers in cell culture", Cytotechnology, vol. 52, pp. 139-149 (2006).

(56) References Cited

OTHER PUBLICATIONS

Upadhyay et al., "Understanding Gas Vesicles and Its Scope in Biotechnological Applications", Advances in Biotechnology and Microbiology, vol. 11, Issue 2, pp. 1-13 (2018).
Substantive Examination Report received in Saudi Arabian Application No. 519410521 dated Aug. 31, 2021.
Gungor-Ozkerim, P. S.; Inci, I.; Zhang, Y. S.; Khademhosseini, A.; Dokmeci, M. R. Biomaterials Science 2018, 6, (5), 915-946.
Donderwinkel, I.; van Hest, J. C. M.; Cameron, N. R. Polymer Chemistry 2017, 8, (31), 4451-4471.
Gopinathan, J.; Noh, I. Biomater Res 2018, 22, 11-11.
Khademhosseini, A.; Camci-Unal, G., 3D Bioprinting in Regenerative Engineering:: Principles and Applications. CRC Press: 2018.
Gjorevski, N.; Sachs, N.; Manfrin, A.; Giger, S.; Bragina, M. E.; Ordonez-Moran, P.; Clevers, H.; Lutolf, M. P. Nature 2016, 539, (7630), 560-564.
Hauser, C. A. E.; Deng, R.; Mishra, A.; Loo, Y.; Khoe, U.; Zhuang, F.; Cheong, D. W.; Accardo, A.; Sullivan, M. B.; Riekel, C.; Ying, J. Y.; Hauser, U. A. Proceedings of the National Academy of Sciences 2011, 108, (4), 1361-1366.
Loo, Y.; Lakshmanan, A.; Ni, M.; Toh, L. L.; Wang, S.; Hauser, C. A. E. Nano Letters 2015, 15, (10), 6919-6925.
Seow, W. Y.; Salgado, G.; Lane, E. B.; Hauser, C. A. E. Scientific Reports 2016, 6, 32670.
Chan, K. H.; Xue, B.; Robinson, R. C.; Hauser, C. A. E. Scientific Reports 2017, 7, (1), 12897.
Wang, H.; Ren, C.; Song, Z.; Wang, L.; Chen, X.; Yang, Z. Nanotechnology 2010, 21, (22), 225606.
Raeburn, J.; Pont, G.; Chen, L.; Cesbron, Y.; Levy, R.; Adams, D. J. Soft Matter 2012, 8, (4), 1168-1174.
Betush, R. J.; Urban, J. M.; Nilsson, B. L. Peptide Science 2018, 110, (1), e23099.
Lakshmanan, A.; Cheong, D. W.; Accardo, A.; Di Fabrizio, E.; Riekel, C.; Hauser, C. A. Proc Natl Acad Sci U S A 2013, 110, (2), 519-24.
Bowerman, C. J.; Ryan, D. M.; Nissan, D. A.; Nilsson, B. L. Molecular BioSystems 2009, 5, (9), 1058-1069.
Senguen, F. T.; Lee, N. R.; Gu, X.; Ryan, D. M.; Doran, T. M.; Anderson, E. A.; Nilsson, B. L. Molecular BioSystems 2011, 7, (2), 486-496.
Surewicz, W. K.; Mantsch, H. H.; Chapman, D. Biochemistry 1993, 32, (2), 389-394.
Goormaghtigh, E.; Cabiaux, V.; Ruysschaert, J.-M. European Journal of Biochemistry 1990, 193, (2), 409-420.
Williams, R. W.; Dunker, A. K. Journal of Molecular Biology 1981, 152, (4), 783-813.
Rivas-Arancibia, S.; Rodríguez-Martínez, E.; Badillo-Ramírez, I.; López-González, U.; Saniger, J. M. Frontiers in Molecular Neuroscience 2017, 10, (137).
Seow, W. Y.; Salgado, G.; Lane, E. B.; Hauser, C. A. E. Scientific Reports 2016, 6.
Tuncaboylu, D. C.; Argun, A.; Sahin, M.; Sari, M.; Okay, O. Polymer 2012, 53, (24), 5513-5522.
Murphy, S. V.; Atala, A. Nature Biotechnology 2014, 32, (8), 773-785.
Grinnell, F. Trends in cell biology 2003, 13, (5), 264-269.
Franco-Barraza, J.; Beacham, D. A.; Amatangelo, M. D.; Cukierman, E. Current protocols in cell biology 2016, 71, (1), 10.9. 1-10.9. 34.
Seliktar, D. Science 2012, 336, (6085), 1124-1128.
Baker, B. M.; Chen, C. S. Journal of cell science 2012, 125, (13), 3015-3024.
Even-Ram, S.; Yamada, K. M. Current opinion in cell biology 2005, 17, (5), 524-532.
Lutolf, M. P.; Lauer-Fields, J. L.; Schmoekel, H. G.; Metters, A. T.; Weber, F. E.; Fields, G. B.; Hubbell, J. A. Proceedings of the National Academy of Sciences 2003, 100, (9), 5413-5418.
Mazzeo, M. S.; Chai, T.; Daviran, M.; Schultz, K. M. ACS applied bio materials 2018, 2, (1), 81-92.
Discher, D. E.; Mooney, D. J.; Zandstra, P. W. Science 2009, 324, (5935), 1673-1677.
Engler, A. J.; Sen, S.; Sweeney, H. L.; Discher, D. E. Cell 2006, 126, (4), 677-689.
Chaudhuri, O.; Gu, L.; Klumpers, D.; Darnell, M.; Bencherif, S. A.; Weaver, J. C.; Huebsch, N.; Lee, H.-p.; Lippens, E.; Duda, G. N. Nature materials 2016, 15, (3), 326-334.
Dalby, M. J.; Gadegaard, N.; Tare, R.; Andar, A.; Riehle, M. O.; Herzyk, P.; Wilkinson, C. D.; Oreffo, R. O. Nature materials 2007, 6, (12), 997-1003.
Haugh, M. G.; Vaughan, T. J.; Madl, C. M.; Raftery, R. M.; McNamara, L. M.; O'Brien, F. J.; Heilshorn, S. C. Biomaterials 2018, 171, 23-33.
Silbernagel, N.; Körner, A.; Balitzki, J.; Jaggy, M.; Bertels, S.; Richter, B.; Hippler, M.; Hellwig, A.; Hecker, M.; Bastmeyer, M. Biomaterials 2020, 227, 119551.
Darnell, M.; Gu, L.; Mooney, D. Biomaterials 2018, 181, 182-188.
Kahin, K.; Khan, Z.; Albagami, M.; Usman, S.; Bahnshal, S.; Alwazani, H.; Majid, M.; Rauf, S.; Hauser, C. In Development of a robotic 3D bioprinting and microfluidic pumping system for tissue and organ engineering, Microfluidics, BioMEMS, and Medical Microsystems XVII, 2019; International Society for Optics and Photonics: p. 108750Q.
Mouser, V. H. M.; Melchels, F. P. W.; Visser, J.; Dhert, W. J. A.; Gawlitta, D.; Malda, J. Biofabrication 2016, 8, (3), 035003.
Chimene, D.; Peak, C. W.; Gentry, J. L.; Carrow, J. K.; Cross, L. M.; Mondragon, E.; Cardoso, G. B.; Kaunas, R.; Gaharwar, A. K. ACS Applied Materials & Interfaces 2018, 10, (12), 9957-9968.
Bertassoni, L. E.; Cardoso, J. C.; Manoharan, V.; Cristino, A. L.; Bhise, N. S.; Araujo, W. A.; Zorlutuna, P.; Vrana, N. E.; Ghaemmaghami, A. M.; Dokmeci, M. R. Biofabrication 2014, 6, (2), 024105.
Markstedt, K.; Mantas, A.; Tournier, I.; Martínez Ávila, H. c.; Hagg, D.; Gatenholm, P. Biomacromolecules 2015, 16, (5), 1489-1496.
Wilson, S. A.; Cross, L. M.; Peak, C. W.; Gaharwar, A. K. ACS applied materials & interfaces 2017, 9, (50), 43449-43458.
Bernal, P. N.; Delrot, P.; Loterie, D.; Li, Y.; Malda, J.; Moser, C.; Levato, R. Advanced materials 2019, 31, (42), 1904209.
Kang, H.-W.; Lee, S. J.; Ko, I. K.; Kengla, C.; Yoo, J. J.; Atala, A. Nature biotechnology 2016, 34, (3), 312.
Hwang, T. L.; Shaka, A. J. Journal of Magnetic Resonance, Series A 1995, 112, (2), 275-279. 46. Derome, A. E.; Williamson, M. P. Journal of Magnetic Resonance (1969) 1990, 88, (1), 177-185.
Piotto, M.; Saudek, V.; Sklenář, V. Journal of Biomolecular NMR 1992, 2, (6), 661-665. 48. Sklenar, V.; Piotto, M.; Leppik, R.; Saudek, V. Journal of Magnetic Resonance, Series A 1993, 102, (2), 241-245.
Derome, A. E.; Williamson, M. P. Journal of Magnetic Resonance (1969) 1990, 88, (1), 177-185.
Sklenar, V.; Piotto, M.; Leppik, R.; Saudek, V. Journal of Magnetic Resonance, Series A 1993, 102, (2), 241-245.
Micsonai, A.; Wien, F.; Kernya, L.; Lee, Y.-H.; Goto, Y.; Réfrégiers, M.; Kardos, J. Proceedings of the National Academy of Sciences 2015, 112, (24), E3095.
Maiti, N. C.; Apetri, M. M.; Zagorski, M. G.; Carey, P. R.; Anderson, V. E. Journal of the American Chemical Society 2004, 126, (8), 2399-2408.
Loo, Y.; Chan, Y. S.; Szczerbinska, I.; Tan, B. C.; Wan, A. C.; Ng, H. H.; Hauser, C. A. A Chemically Well-Defined, Self-Assembling 3D Substrate for Long-Term Culture of Human Pluripotent Stem Cells. ACS Appl. Bio Mater. 2019, 2, 1406-1412.
Lee, J. H.; Jung, H. W.; Kang, L-K.; Lee, H. B. Cell behaviour on polymer surfaces with different functional groups. Biomaterials 1994, 15, 705-711.
Guo, S.; Zhu, X.; Li, M.; Shi, L.; Ong, J. L. T.; Jańczewski.D.; Neoh, K. G. Parallel Control over Surface Charge and Wettability Using Polyelectrolyte Architecture: Effect on Protein Adsorption and Cell Adhesion. ACS Appl. Mater. Interfaces 2016, 8, 30552-30563.
Hauser, C. A. E.; Zhang, S. Designer self-assembling peptide nanofiber biological materials. Chem. Soc. Rev. 2010, 39, 2780-2790.

(56) References Cited

OTHER PUBLICATIONS

Bowerman, C. J.; Ryan, D. M.; Nissan, D. A.; Nilsson, B. L. The Effect of Increasing Hydrophobicity on the Self-Assembly of Amphipathic β-Sheet Peptides. Mol. Biosyst. 2009, 5, 1058-1069.

Susapto, H. H.; Alhattab, D.; Abdelrahman, S.; Khan, Z.; Alshehri, S.; Kahin, K.; Ge, R.; Moretti, M.; Emwas, A. H.; Hauser, C. A. E. Ultrashort Peptide Bioinks Support Automated Printing of Large-Scale Constructs Assuring Long-Term Survival of Printed Tissue Constructs. Nano Lett. 2021, 2719.

Friedrichs, J.; Taubenberger, A.; Franz, C. M.; Muller, D. J. Cellular Remodelling of Individual Collagen Fibrils Visualized by Time-lapse AFM. J. Mol. Biol. 2007, 372, 594-607.

Nakayama, M.; Amano, M.; Katsumi, A.; Kaneko, T.; Kawabata, S.; Takefuji, M.; Kaibuchi, K. Rho-kinase and myosin II activities are required for cell type and environment specific migration. Genes Cells 2005, 10, 107-117.

Beadle, C.; Assanah, M. C.; Monzo, P.; Vallee, R.; Rosenfeld, S. S.; Canoil, P. The Role of Myosin II in Glioma Invasion of the Brain. Mol. Biol. Cell 2008, 19, 3357-3368.

Friedl, P.; Wolf, K.; Lammerding, J. Nuclear mechanics during cell migration. Curr. Opin. Cell Biol. 2011, 23, 55-64.

Balzer, E. M.; Tong, Z.; Paul, C. D.; Hung, W.-C.; Stroka, K. M.; Boggs, A. E.; Martin, S. S.; Konstantopoulos, K. Physical confinement alters tumor cell adhesion and migration phenotypes. FASEB J. 2012, 26, 4045-4056.

Khatau, S. B.; Bloom, R. J.; Bajpai, S.; Razafsky, D.; Zang, S.; Giri, A.; Wu, P.-H.; Marchand, J.; Celedon, A.; Hale, C. M.; Sun, S. X.; Hodzic, D.; Wirtz, D. The distinct roles of the nucleus and nucleus-cytoskeleton connections in three-dimensional cell migration. Sci. Rep. 2012, 2, No. 488.

Wen, J. H.; Vincent, L. G.; Fuhrmann, A.; Choi, Y. S.; Hribar, K. C.; Taylor-Weiner, H.; Chen, S.; Engler, A. J. Interplay of matrix stiffness and protein tethering in stem cell differentiation. Nat. Mater. 2014, 13, 979-987.

Thievessen, I.; Thompson, P. M.; Beriemont, S.; Plevock, K. M.; Plotnikov, S. V.; Zemljic-Harpf, A.; Ross, R. S.; Davidson, M. W.; Danuser, G.; Campbell, S. L.; Waterman, C. M. Vinculin-actin interaction couples actin retrograde flow to focal adhesions, but is dispensable for focal adhesion growth. J. Cell Biol. 2013, 202, 163-177.

Humphries, J. D.; Wang, P.; Streuli, C.; Geiger, B.; Humphries, M. J.; Ballestrem, C. Vinculin controls focal adhesion formation by direct interactions with talin and actin. J. Cell. Biol. 2007, 179, 1043-1057.

Ode, A.; Schoon, J.; Kurtz, A.; Gaetjen, M.; Ode, J. E.; Geissler, S.; Duda, G. N. CD73/5'-ecto-nucleotidase acts as a regulatory factor in osteo-/chondrogenic differentiation of mechanically stimulated mesenchymal stromal cells. Eur. Cells Mater. 2013, 25, 37-47.

Aslan, H.; Zilberman, Y.; Kandel, L.; Liebergall, M.; Oskouian, R. J.; Gazit, D.; Gazit, Z. Osteogenic differentiation of noncultured immunoisolated bone marrow-derived CD105+ cells. Stem Cells 2006, 24, 1728-1737.

Huang, S.; Ingber, D. E. The structural and mechanical complexity of cell-growth control. Nat. Cell Biol. 1999, 1, No. E131.

McBeath, R.; Pirone, D. M.; Nelson, C. M.; Bhadriraju, K.; Chen, C. S. Cell shape, cytoskeletal tension, and RhoA regulate stem cell lineage commitment. Dev. Cell 2004, 6, 483-495.

Katz, B.-Z.; Zamir, E.; Bershadsky, A.; Kam, Z.; Yamada, K. M.; Geiger, B. Physical state of the extracellular matrix regulates the structure and molecular composition of cell-matrix adhesions. Mol. Biol. Cell 2000, 11, 1047-1060.

Cukierman, E.; Pankov, R.; Stevens, D. R.; Yamada, K. M. Taking cell-matrix adhesions to the third dimension. Science 2001, 294, 1708-1712.

Fischbach, C.; Kong, H. J.; Hsiong, S. X.; Evangelista, M.B.; Yuen, W.; Mooney, D. J. Cancer cell angiogenic capability is regulated by 3D culture and integrin engagement. Proc. Natl. Acad. Sci. U.S.A. 2009, 106, 399-404.

Hsiong, S. X.; Boontheekul, T.; Huebsch, N.; Mooney, D. J. Cyclic arginine-glycine-aspartate peptides enhance three-dimensional stem cell osteogenic differentiation. Tissue Eng., Part A 2009, 15, 263-272.

Park, J. S.; Huang, N. F.; Kurpinski, K. T.; Patel, S.; Hsu, S.; Li, S. Mechanobiology of mesenchymal stem cells and their use in cardiovascular repair. Front. Biosci. 2007, 12, 5098-5116.

Tan, S.; Fang, J. Y.; Yang, Z.; Nimni, M. E.; Han, B. The synergetic effect of hydrogel stiffness and growth factor on osteogenic differentiation. Biomaterials 2014, 35, 5294-5306.

Knight, B.; Laukaitis, C.; Akhtar, N.; Hotchin, N. A.; Edlund, M.; Horwitz, A. R. Visualizing muscle cell migration in situ. Curr. Biol. 2000, 10, 576-585.

Roskelley, C.; Desprez, P.; Bissell, M. Extracellular matrix-dependent tissue-specific gene expression in mammary epithelial cells requires both physical and biochemical signal transduction. Proc. Natl. Acad. Sci. U.S.A. 1994, 91, 12378-12382.

Thievessen, I.; Fakhri, N.; Steinwachs, J.; Kraus, V.; McIsaac, R. S.; Gao, L.; Chen, B.-C.; Baird, M. A.; Davidson, M. W.; Betzig, E.; et al. Vinculin is required for cell polarization, migration, and extracellular matrix remodeling in 3D collagen. FASEB J. 2015, 29, 4555-4567.

Case, L. B.; Baird, M. A.; Shtengel, G.; Campbell, S. L.; Hess, H. F.; Davidson, M. W.; Waterman, C. M. Molecular mechanism of vinculin activation and nanoscale spatial organization in focal adhesions. Nat. Cell Biol. 2015, 17, 880-892.

Carisey, A.; Ballestrem, C. Vinculin, an adapter protein in control of cell adhesion signalling. Eur. J. Cell Biol. 2011, 90, 157-163.

Xu, W.; Baribault, H.; Adamson, E. D. Vinculin knockout results in heart and brain defects during embryonic development. Development 1998, 125, 327-337.

Kumar, G.; Tison, C. K.; Chatterjee, K.; Pine, P. S.; McDaniel, J. H.; Salit, M. L.; Young, M. F.; Simon, C. G., Jr. The determination of stem cell fate by 3D scaffold structures through the control of cell shape. Biomaterials 2011, 32, 9188-9196.

Pablo Rodríguez, J.; González, M.; Ríos, S.; Cambiazo, V. Cytoskeletal organization of human mesenchymal stem cells (MSC) changes during their osteogenic differentiation. J. Cell. Biochem. 2004, 93, 721-731.

Treiser, M. D.; Yang, E. H.; Gordonov, S.; Cohen, D. M.; Androulakis, I. P.; Kohn, J.; Chen, C. S.; Moghe, P. V. Cytoskeleton-based forecasting of stem cell lineage fates. Proc. Natl. Acad. Sci. U.S.A. 2010, 107, 610-615.

Hunter, G. K.; Hauschka, P. V.; Poole, R. A.; Rosenberg, L. C.; Goldberg, H. A. Nucleation and inhibition of hydroxyapatite formation by mineralized tissue proteins. Biochem. J. 1996, 317, 59-64.

Wang, J.; Cui, X.; Zhou, Y.; Xiang, Q. Core-shell PLGA/ collagen nanofibers loaded with recombinant FN/CDHs as bone tissue engineering scaffolds. Connect. Tissue Res. 2014, 55, 292-298.

Khan, S. N.; Lane, J. M. Bone Tissue Engineering: Basic Science and Clinical Concepts. Orthopedic Tissue Engineering; CRC Press, 2004; pp. 177-194.

Oreffo, R. O.; Kusec, V.; Romberg, S.; Triffitt, J. T. Human bone marrow osteoprogenitors express estrogen receptor-alpha and bone morphogenetic proteins 2 and 4 mRNA during osteoblastic differentiation. J. Cell. Biochem. 1999, 75, 382-392.

Frank, O.; Heim, M.; Jakob, M.; Barbera, A.; Schäfer, D.; Bendik, I.; Dick, W.; Heberer, M.; Martin, I. Real-time quantitative RT-PCR analysis of human bone marrow stromal cells during osteogenic differentiation in vitro. J. Cell. Biochem. 2002, 85, 737-746.

Miron, R.; Zhang, Y. Osteoinduction: a review of old concepts with new standards. J. Dent. Res. 2012, 91, 736-744.

Rittling, S. R.; Matsumoto, H. N.; Mckee, M. D.; Nanci, A.; An, X. R.; Novick, K. E.; Kowalski, A. J.; Noda, M.; Denhardt, D. T. Mice lacking osteopontin show normal development and bone structure but display altered osteoclast formation in vitro. J. Bone Miner. Res. 1998, 13, 1101-1111.

Chellaiah, M. A.; Kizer, N.; Biswas, R.; Alvarez, U.; Strauss-Schoenberger, J.; Rifas, L.; Rittling, S. R.; Denhardt, D. T.; Hruska, K. A. Osteopontin deficiency produces osteoclast dysfunction due to reduced CD44 surface expression. Mol. Biol. Cell 2003, 14, 173-189.

(56) References Cited

OTHER PUBLICATIONS

Bax, D. V.; Rodgers, U. R.; Bilek, M. M.; Weiss, A. S. Cell adhesion to tropoelastin is mediated via the C-terminal GRKRK motif and integrin αVβ3. J. Biol. Chem. 2009, 284, 28616-28623.

Taddese, S.; Weiss, A. S.; Jahreis, G.; Neubert, R. H.; Schmelzer, C. E. In vitro degradation of human tropoelastin by MMP-12 and the generation of matrikines from domain 24. Matrix Biol. 2009, 28, 84-91.

Getie, M.; Schmelzer, C.; Neubert, R. Characterization of peptides resulting from digestion of human skin elastin with elastase. Proteins 2005, 61, 649-657.

Phillips, J. E.; Petrie, T. A.; Creighton, F. P.; García, A. J. Human mesenchymal stem cell differentiation on self-assembledmonolayers presenting different surface chemistries. Acta Biomater. 2010, 6, 12-20.

Nemir, S.; West, J. L. Synthetic materials in the study of cell response to substrate rigidity. Ann. Biomed. Eng. 2010, 38, 2-20.

Holst, J.; Watson, S.; Lord, M. S.; Eamegdool, S. S.; Bax, D. V.; Nivison-Smith, L. B.; Kondyurin, A.; Ma, L.; Oberhauser, A. F.; Weiss, A. S.; Rasko, J. E. J. Substrate elasticity provides mechanical signals for the expansion of hemopoietic stem and progenitor cells. Nat. Biotechnol. 2010, 28, 1123.

Rowlands, A. S.; George, P. A.; Cooper-White, J. J. Directing osteogenic and myogenic differentiation of MSCs: interplay of stiffness and adhesive ligand presentation. Am. J. Physiol.: Cell Physiol. 2008, 295, C1037-C1044.

Saha, K.; Keung, A. J.; Irwin, E. F.; Li, Y.; Little, L.; Schaffer, D. V.; Healy, K. E. Substrate modulus directs neural stem cell behavior. Biophys. J. 2008, 95, 4426-4438.

Gauthaman, K.; Venugopal, J. R.; Yee, F. C.; Biswas, A.; Ramakrishna, S.; Bongso, A. Osteogenic differentiation of human Wharton's jelly stem cells on nanofibrous substrates in vitro. Tissue Eng., Part A 2011, 17, 71-81.

Leng, Q.; Chen, L.; Lv, Y. RNA-based scaffolds for bone regeneration: application and mechanisms of mRNA, miRNA and siRNA. Theranostics 2020, 10, 3190.

Erdem, A.; Darabi, M. A.; Nasiri, R.; Sangabathuni, S.; Ertas, Y. N.; Alem, H.; Hosseini, V.; Shamloo, A.; Nasr, A. S.; Ahadian, S. 3D Bioprinting of Oxygenated Cell-Laden Gelatin Methacryloyl Constructs. Adv. Healthcare Mater. 2020, 9, No. 1901794.

Myeroff, C.; Archdeacon, M. Autogenous bone graft: donor sites and techniques. J. Bone Jt. Surg. 2011, 93, 2227-2236.

Silbernagel, N.; Körner, A.; Balitzki, J.; Jaggy, M.; Bertels, S.; Richter, B.; Hippler, M.; Hellwig, A.; Hecker, M.; Bastmeyer, M.; Ullrich, N. D. Shaping the Heart: Structural and Functional Maturation of iPSC-Cardiomyocytes in 3D-Micro-Scaffolds. Biomaterials 2020, 227, No. 119551.

Silber, J. S.; Anderson, D. G.; Daffner, S. D.; Brislin, B. T.; Leland, J. M.; Hilibrand, A. S.; Vaccaro, A. R.; Albert, T. J. Donor site morbidity after anterior iliac crest bone harvest for single-level anterior cervical discectomy and fusion. Spine 2003, 28, 134-139.

Alonzo, M.; Alvarez Primo, F.; Anil Kumar, S.; Mudloff, J. A.; Dominguez, E.; Fregoso, G.; Ortiz, N.; Weiss, W. M.; Joddar, B. Bone tissue engineering techniques, advances, and scaffolds for treatment of bone defects. Curr. Opin. Biomed. Eng. 2021, 17, No. 100248.

Amini, A. R.; Laurencin, C. T.; Nukavarapu, S. P. Bone tissue engineering: recent advances and challenges. Crit. Rev. Biomed. Eng. 2012, 40, 363-408.

Bharadwaz, A.; Jayasuriya, A. C. Recent trends in the application of widely used natural and synthetic polymer nanocomposites in bone tissue regeneration. Mater. Sci. Eng., C 2020, 110, No. 110698.

Pittenger, M. F.; Mackay, A. M.; Beck, S. C.; Jaiswal, R. K.; Douglas, R.; Mosca, J. D.; Moorman, M. A.; Simonetti, D. W.; Craig, S.; Marshak, D. R. Multilineage potential of adult human mesenchymal stem cells. Science 1999, 284, 143-147.

Ma, K.; Laco, F.; Ramakrishna, S.; Liao, S.; Chan, C. K. Differentiation of bone marrow-derived mesenchymal stem cells into multi-layered epidermis-like cells in 3D organotypic coculture. Biomaterials 2009, 30, 3251-3258.

Petite, H.; Viateau, V.; Bensaid, W.; Meunier, A.; de Pollak, C.; Bourguignon, M.; Oudina, K.; Sedel, L.; Guillemin, G. Tissue-engineered bone regeneration. Nat. Biotechnol. 2000, 18, 959.

Takamine, Y.; Tsuchiya, H.; Kitakoji, T.; Kurita, K.; Ono, Y.; Ohshima, Y.; Kitoh, H.; Ishiguro, N.; Iwata, H. Distraction osteogenesis enhanced by osteoblastlike cells and collagen gel. Clin. Orthop. Relat. Res. 2002, 399, 240-246.

Kofidis, T.; Lebl, D. R.; Martinez, E. C.; Hoyt, G.; Tanaka, M.; Robbins, R. C. Novel injectable bioartificial tissue facilitates targeted, less invasive, large-scale tissue restoration on the beating heart after myocardial injury. Circulation 2005, 112, I-173-I-177.

Yildirim, Y.; Naito, H.; Didié, M.; Karikkineth, B. C.; Biermann, D.; Eschenhagen, T.; Zimmermann, W.-H. Development of a biological ventricular assist device: preliminary data from a small animal model. Circulation 2007, 116, I-16-I-23.

Radisic, M.; Park, H.; Shing, H.; Consi, T.; Schoen, F. J.; Langer, R.; Freed, L. E.; Vunjak-Novakovic, G. Functional assembly of engineered myocardium by electrical stimulation of cardiac myocytes cultured on scaffolds. Proc. Natl. Acad. Sci. U.S.A. 2004, 101, 18129-18134.

Spadaccio, C.; Chachques, E.; Chello, M.; Covino, E.; Chachques, J. C.; Genovese, J. Predifferentiated adult stem cells and matrices for cardiac cell therapy. Asian Cardiovasc. Thorac. Ann. 2010, 18, 79-87.

Kutschka, I.; Chen, I. Y.; Kofidis, T.; Arai, T.; Von Degenfeld, G.; Sheikh, A. Y.; Hendry, S. L.; Pearl, J.; Hoyt, G.; Sista, R.; et al. Collagen matrices enhance survival of transplanted cardiomyoblasts and contribute to functional improvement of ischemic rat hearts. Circulation 2006, 114, I-167-I-173.

Orkin, R.; Gehron, P.; Mcgoodwin, E. B.; Martin, G.; Valentine, T.; Swarm, R. A murine tumor producing a matrix of basement membrane. J. Exp. Med. 1977, 145, 204-220.

Sethi, T.; Rintoul, R. C.; Moore, S. M.; MacKinnon, A. C.; Salter, D.; Choo, C.; Chilvers, E. R.; Dransfield, I.; Donnelly, S. C.; Strieter, R.; et al. Extracellular matrix proteins protect small cell lung cancer cells against apoptosis: a mechanism for small cell lung cancer growth and drug resistance in vivo. Nat. Med. 1999, 5, 662-668.

Grant, D.; Kibbey, M.; Kinsella, J.; Cid, M.; Kleinman, H. The role of basement membrane in angiogenesis and tumor growth. Pathol., Res. Pract. 1994, 190, 854-863.

Fushimi, H.; Hiratsuka, T.; Okamura, A.; Ono, Y.; Ogura, I.; Nishimura, I. Recombinant collagen polypeptide as a versatile bone graft biomaterial. Commun. Mater. 2020, 1, No. 1.

Kang, P. L.; Huang, H. H.; Chen, T.; Ju, K. C.; Kuo, S. M. Angiogenesis-promoting effect of LIPUS on hADSCs and HUVECs cultured on collagen/hyaluronan scaffolds. Mater. Sci. Eng., C 2019, 102, 22-33.

Blokhuis, T.; Arts, J. C. Bioactive and osteoinductive bone graft substitutes: definitions, facts and myths. Injury 2011, 42, S26-S29.

Barradas, A.; Yuan, H.; van Blitterswijk, C. A.; Habibovic, P. Osteoinductive biomaterials: current knowledge of properties, experimental models and biological mechanisms. Eur. Cells Mater. 2011, 21, 407-429.

Habibovic, P.; de Groot, K. Osteoinductive biomaterials焔 properties and relevance in bone repair. J. Tissue Eng. Regener. Med. 2007, 1, 25-32.

Ramier, J.; Grande, D.; Bouderlique, T.; Stoilova, O.; Manolova, N.; Rashkov, I.; Langlois, V.; Albanese, P.; Renard, E. From design of bio-based biocomposite electrospun scaffolds to osteogenic differentiation of human mesenchymal stromal cells. J. Mater. Sci. Mater. Med. 2014, 25, 1563-1575.

Adler-Abramovich, L.; Gazit, E. The physical properties of supramolecular peptide assemblies: from building block association to technological applications. Chem. Soc. Rev. 2014, 43, 6881-6893.

Biesalski, M. A.; Knaebel, A.; Tu, R.; Tirrell, M. Cell adhesion on a polymerized peptide-amphiphile monolayer. Biomaterials 2006, 27, 1259-1269.

Mata, A.; Hsu, L.; Capita, R.; Aparicio, C.; Henrikson, K.; Stupp, S. I. Micropatterning of bioactive self-assembling gels. Soft Matter 2009, 5, 1228-1236.

(56) References Cited

OTHER PUBLICATIONS

Eren, E. D.; Tansik, G.; Tekinay, A. B.; Guler, M. O. Mineralized peptide nanofiber gels for enhanced osteogenic differentiation. ChemNanoMat 2018, 4, 837-845.
Mata, A.; Geng, Y.; Henrikson, K. J.; Aparicio, C.; Stock, S. R.; Satcher, R. L.; Stupp, S. I. Bone regeneration mediated by biomimetic mineralization of a nanofiber matrix. Biomaterials 2010, 31, 6004-6012.
Derkus, B.; Okesola, B. O.; Barrett, D. W.; D'Este, M.; Chowdhury, T. T.; Eglin, D.; Mata, A. Multicomponent hydrogels for the formation of vascularized bone-like constructs in vitro. Acta Biomater. 2020, 109, 82-94.
Ghosh, M.; Halperin-Sternfeld, M.; Grigoriants, I.; Lee, J.; Nam, K. T.; Adler-Abramovich, L. Arginine-presenting peptide hydrogels decorated with hydroxyapatite as biomimetic scaffolds for bone regeneration. Biomacromolecules 2017, 18, 3541-3550.
Tsutsumi, H.; Kawamura, M.; Mihara, H. Osteoblastic differentiation on hydrogels fabricated from Ca2+-responsive self-assembling peptides functionalized with bioactive peptides. Bioorg. Med. Chem. 2018, 26, 3126-3132.
Zhang, R.; Liu, Y.; Qi, Y.; Zhao, Y.; Nie, G.; Wang, X.; Zheng, S. Self-assembled peptide hydrogel scaffolds with VEGF and BMP-2 Enhanced in vitro angiogenesis and osteogenesis. Oral Dis. 2021, DOI: 10.1111/odi.13785, in press.
Misawa, H.; Kobayashi, N.; Soto-Gutierrez, A.; Chen, Y.; Yoshida, A.; Rivas-Carrillo, J. D.; Navarro-Alvarez, N.; Tanaka, K.; Miki, A.; Takei, J.; et al. PuraMatrix facilitates bone regeneration in bone defects of calvaria in mice. Cell Transplant. 2006, 15, 903-910.
Ikeno, M.; Hibi, H.; Kinoshita, K.; Hattori, H.; Ueda, M. Effects of self-assembling peptide hydrogel scaffold on bone regeneration with recombinant human bone morphogenetic protein-2. Int. J. Oral Maxillofac. Implants 2013, 28, e283-9.
He, B.; Ou, Y.; Chen, S.; Zhao, W.; Zhou, A.; Zhao, J.; Li, H.; Jiang, D.; Zhu, Y. Designer bFGF-incorporated d-form self-assembly peptide nanofiber scaffolds to promote bone repair. Mater. Sci. Eng., C 2017, 74, 451-458.
Tsukamoto, J.; Naruse, K.; Nagai, Y.; Kan, S.; Nakamura, N.; Hata, M.; Omi, M.; Hayashi, T.; Kawai, T.; Matsubara, T. Efficacy of a self-assembling peptide hydrogel, SPG-178-gel, for bone regeneration and three-dimensional osteogenic induction of dental pulp stem cells. Tissue Eng., Part A 2017, 23, 1394-1402.
Sun, Y.; Li, W.; Wu, X.; Zhang, N.; Zhang, Y.; Ouyang, S.; Song, X.; Fang, X.; Seeram, R.; Xue, W.; He, L.; Wu, W. Functional Self-Assembling Peptide Nanofiber Hydrogels Designed for Nerve Degeneration. ACS Appl. Mater. Interfaces 2016, 8, 2348-2359.
Guo, J.; Su, H.; Zeng, Y.; Liang, Y.-X.; Wong, W. M.; Ellis-Behnke, R. G.; So, K.-F.; Wu, W. Reknitting the injured spinal cord by self-assembling peptide nanofiber scaffold. Nanomedicine 2007, 3, 311-321.
Liu, X.; Wang, X.; Wang, X.; Ren, H.; He, J.; Qiao, L.; Cui, F.-Z. Functionalized self-assembling peptide nanofiber hydrogels mimic stem cell niche to control human adipose stem cell behavior in vitro. Acta Biomater. 2013, 9, 6798-6805.
Rauf, S.; Susapto, H. H.; Kahin, K.; Alshehri, S.; Abdelrahman, S.; Lam, J. H.; Asad, S.; Jadhav, S.; Sundaramurthi, D.; Gao, X.; Hauser, C. A. E. Self-assembling tetrameric peptides allow in situ 3D bioprinting under physiological conditions. J. Mater. Chem. B 2021, 9, 1069-1081.
Susapto, H. H.; Alhattab, D.; Abdelrahman, S.; Khan, Z.; Alshehri, S.; Kahin, K.; Ge, R.; Moretti, M.; Emwas, A.-H.; Hauser, C. A. E. Ultrashort Peptide Bioinks Support Automated Printing of Large-Scale Constructs Assuring Long-Term Survival of Printed Tissue Constructs. Nano Lett. 2021, 21, 2719-2729.
Arthur, A.; Zannettino, A.; Gronthos, S. The therapeutic applications of multipotential mesenchymal/stromal stem cells in skeletal tissue repair. J. Cell. Physiol. 2009, 218, 237-245.
Polo-Corrales, L.; Latorre-Esteves, M.; Ramirez-Vick, J. E. Scaffold design for bone regeneration. J. Nanosci. Nanotechnol. 2014, 14, 15-56.
Holmes, T. C. Novel peptide-based biomaterial scaffolds for tissue engineering. Trends Biotechnol. 2002, 20, 16-21.
Hauser, C. A.; Deng, R.; Mishra, A.; Loo, Y.; Khoe, U.; Zhuang, F.; Cheong, D. W.; Accardo, A.; Sullivan, M. B.; Riekel, C.; Ying, J. Y.; Hauser, U. A. Natural tri- to hexapeptides self-assemble in water to amyloid beta-type fiber aggregates by unexpected alpha-helical intermediate structures. Proc. Natl. Acad. Sci. U.S.A. 2011, 108, 1361-1366.
Lei, Y.; Gojgini, S.; Lam, J.; Segura, T. The spreading, migration and proliferation of mouse mesenchymal stem cells cultured inside hyaluronic acid hydrogels. Biomaterials 2011, 32, 39-47.
Examination Report received in Saudi Arabian Application No. 519410522 dated Aug. 2, 2022.
Search Report and Written Opinion received in PCT Application No. PCT/IB2022/051913 dated Jun. 14, 2022.
Office Action received in U.S. Appl. No. 16/612,580 dated Jun. 6, 2022.
Bowie et al., "Deciphering the Message in Protein Sequences: Tolderance to Amino Acid Substitutions", Science, vol. 249, pp. 1306-1310 (1990).
Burgess et al., "Possible dissociation of the heparin-binding and mitogenic activities of heparin-binding (acidic fibroblast) growth factor-1 from its receptor-binding activities by site-directed mutagenesis of a single lysine residue", J. cell Biol, vol. 111, pp. 2129-2138 (1990).
Loo et al., "Peptide Bioink: Self-Assembling Nanofibrous Scaffolds for Three-Dimensional Organotypic Cultures", vol. 15, pp. 1-13, XP055486589 (2015).
Li, Z.; Huang, S.; Liu, Y.; Yao, B.; Hu, T.; Shi, H.; Xie, J.; Fu, X. Scientific Reports 2018, 8, (1), 8020.
Jorgensen, W. L.; Tirado-Rives, J. Proceedings of the National Academy of Sciences of the United States of America 2005, 102, (19), 6665.
Dodda, L. S.; Cabeza de Vaca, I.; Tirado-Rives, J.; Jorgensen, W. L. Nucleic Acids Research 2017, 45, (W1), W331-W336.
Abraham, M. J.; Murtola, T.; Schulz, R.; Páll, S.; Smith, J. C.; Hess, B.; Lindahl, E. SoftwareX 2015, 1-2, 19-25.
Darden, T.; York, D.; Pedersen, L. The Journal of Chemical Physics 1993, 98, (12), 10089-10092.
Berendsen, H. J. C.; Postma, J. P. M.; Gunsteren, W. F. v.; DiNola, A.; Haak, J. R. The Journal of Chemical Physics 1984, 81, (8), 3684-3690.
Bussi, G.; Donadio, D.; Parrinello, M. The Journal of Chemical Physics 2007, 126, (1), 014101.
Kim, Y. H.; Baek, N. S.; Han, Y. H.; Chung, M.-A.; Jung, S.-D. Journal of neuroscience methods 2011, 202, (1), 38-44.
Riss, T. L.; Valley, M. P.; Zimprich, C. A.; Niles, A. L.; Kupcho, K. R.; Lazar, D. F. 60. Howe, B.; Umrigar, A.; Tsien, F. JoVE (Journal of Visualized Experiments) 2014, (83), e50203.
Howe, B.; Umrigar, A.; Tsien, F. JoVE (Journal of Visualized Experiments) 2014, (83), e50203.
Worton, R. G.; Duff, C., [27] Karyotyping. In Methods in enzymology, Elsevier: 1979; vol. 58, pp. 322-344.
Perrier, A. L.; Tabar, V.; Barberi, T.; Rubio, M. E.; Bruses, J.; Topf, N.; Harrison, N. L.; Studer, L. Proceedings of the National Academy of Sciences 2004, 101, (34), 12543-12548.
Kang, J.; Lee, I. Cardiovascular Pathology 2006, 15, (4), 218-221.
Blakely, B. D.; Bye, C. R.; Fernando, C. V.; Horne, M. K.; Macheda, M. L.; Stacker, S. A.; Arenas, E.; Parish, C. L. PloS one 2011, 6, (3), e18373.
Bowie et al., "Deciphering the Message in Protein Sequences: Tolerance to Amino Acid Substitutions", Science, vol. 47, pp. 1306-1310 (1990).
Burgess et al., "Possible Dissociation of the Heparin-binding Mitogenic Activities of Haparin-binding (Acidic Fibroblast) Growth Factor-1 from Its Receptor-binding Activities by Site-directed Mutagenesis of a Single Lysine Residue", The Journal of Cell Biology, vol. 111, pp. 2129-2138 (1990).
Loo et al, "Peptide Bioink: Printable Nanofibrous Scaffolds for 3D Organotyic Cultures", vol. 15, XP055486589 (2015).
Suspato et al, "Ultrashort Peptide Bioinks Support Automated Printing of Large-Scale Constructs Assuring Long-Term Survival of Printed Tissue Constructs", Nano Lett. 21, 7, pp. 2719-2729 (2021).

(56) References Cited

OTHER PUBLICATIONS

International Search Report and Written Opinion received in PCT Application No. PCT/IB2021/057622 dated Dec. 16, 2021.
Substantive Examination Report received in Saudi Arabian Application No. 519410522.
Fichman et al., "Self-assembly of short peptides to form hydrogels: Design of building blocks, physical properties and technological applications", Acta Biomaterialia, 16, pp. 1571-1582 (2014).
Office Action received in U.S. Appl. No. 16/612,881 dated May 20, 2021.
Office Action received in U.S. Appl. No. 16/612,881 dated Dec. 30, 2020.
International Search Report and Written Opinion received in PCT Application No. PCT/IB2021/057624, dated Aug. 19, 2021.
Final Official Action received in Japanese Application No. 2019-561848 dated Oct. 11, 2022.
Examination Report received in European Application No. 18 720 665.1 dated Oct. 25, 2022.
Official Action received in Japanese Application No. 2019-561747 dated Sep. 13, 2022.
Examination Report received in Saudi Arabian Application No. 521430991 dated Aug. 18, 2022.
Office Action received in U.S. Appl. No. 16/612,580 dated Sep. 21, 2022.
Office Action received in U.S. Appl. No. 17/401,800 dated Aug. 30, 2022.
International Search Report and Written Opinion received in International Application No. PCT/IB2022/055194 dated Sep. 20, 2022.
International Search Report and Written Opinion received in International Application No. PCT/IB2022/055054 dated Sep. 26, 2022.
Alshehri et al., "Scaffolds from Self-Assembling Tetrapeptides Support 3D Spreading, Osteogenic Differentiation, and Angiogenesis of Mesenchymal Stem Cells", Biomacromolecules, vol. 22, pp. 2094-2106 (2021).
Chen et al., "Hydrogelation of the Short Self-Assembling Peptide I3QGK Regulated by Transglutaminase and Use for Rapid Hemostasis", ACS Appl Matter Interfaces, vol. 28, pp. 17833-17841 (2016).
Echalier et al., "Modular bioink for 3D printing of biocompatible hydrogels: sol-gel polymerization of hybrid peptides anti polymers", RSC Advances, vol. 7, pp. 12231-12235 (2017).
Holzl et al., "Bioink properties before, during and after 3D printing", Biofabrication, vol. 8, Mar. 2002 (2016).
Holz et al., "High-Power 365 nm UV LED Mercury Arc Lamp Replacement for Photochemistry and Chemical Photolithography", ACS Sustainable Chemistry & Engineering, vol. 5, pp. 828-834 (2017).
Lim et al., "New Visible-Light Photoinitiating System for Improved Print Fidelity in Gelatin-Based Bioinks", ACS Biomaterials Science and Engineering, vol. 2, pp. 1752-1762 (2016).
Loo et al., "Bioprinting synthetic self-assembling peptide hydrogels for boimedical applications", Biomedical Materials, vol. 11, No. 1 (2015).
Sekine et al., "Capillary Networks for Bio-Artificial Three-Dimensional Tissues Fabricated Using Cell Sheet Based Tissue Engineering", International Journal of Molecular Sciences, vol. 22, No. 92, pp. 1-12 (2021).
Susapto et al., "Ultrashort Peptide Bioinks Support Automated Printing of Large-Scale Constructs Assuring Long-Term Survival of Printed Tissue Constructs", Nano Letters, vol. 21, pp. 2719-2729 (2021).

Yan et al., "Advances in portable electrospinning devices for in situ delivery of personalized wound care", Nanoscale, vol. 11, pp. 19166-19178 (2019).
Office Action received in Korean Application No. 10-2019-7036272 dated Oct. 21, 2022.
International Search Report and Written Opinion received in PCT Application No. PCT/IB2018/052173 dated Sep. 9, 2018.
International Search Report and Written Opinion received in PCT Application No. PCT/IB2018/052189 dated Aug. 28, 2018.
Office Action received in Saudi Arabian Application No. 519410522.
Office Action received in Korean Application No. 10-2019-7036277 dated Sep. 29, 2021.
Office Action received in Saudi Arabian Application No. 519410521.
Loo et al., "Peptide Biolink: Self-Assembling Nanofibrous Scaffolds for Three-Dimensional Organotypic Cultures", Nano Letters, vol. 15, pp. 6919-6925 (2015).
Bowie et al., "Deciphering the Message in Protein Sequences: Tolerance of Amino Acid Substitutions", Science, vol. 247, pp. 1306-1310 (1990).
Burgess et al., "Possible Dissociation of the Heparin-binding Mitogenic Activities of Heparin-binding (Acid Fibroblast) Growth Factor-1 from Its Receptor-binding Activities by Site-directed Mutagenesis of a Single Lysine Residue", The Journal of Cell Biology, vol. 111, pp. 2129-2138 (1990).
Loo et al., "Peptide Bioink: Printable Nanofibrous Scaffolds for 3D Organotypic Cultures", vol. 15, XP055486589 (2015).
Fichman et al., "Self-assembly of short peptides to form hydrogels: Design of building blocks, physical properties and technological applications", Acta Biomaterials, vol. 10, pp. 1671-1682 (2014).
Office Action received in Japanese Patent Application No. 2019-561848 dated Apr. 5, 2022.
Office Action received in Japanese Patent Application No. 2019-561747 dated Mar. 15, 2022.
Notice of Allowance received in Korean Application No. 10-2019-7036377 dated Apr. 6, 2022.
Search Report and Written Opinion received in PCT Application No. PCT/IB2021/060795 dated Nov. 22, 2021.
Ali et al., "A Non-Canonical NRPS Is Involved in the Synthesis of Fungisporin and Related Hydrophobic Cyclic Tetrapeptides in Penicillium chrysogenum", PLOS ONE, vol. 9, Issue 6, pp. 1-10 (2014).
Alrashoudi et al., "Fabrication of a Lateral Flow Assay for Rapid In-Field Detection of COVID-19 Antibodies Using Additive Manufacturing Printing Technologies", International Journal of Bioprinting, vol. 7, Issue 4, pp. 76-84 (2021).
Farrera-Soler et al, "Identification of immunodominant linear epitodes from SARS-CoV-2 patient plasma", PLOS ONE, pp. 1-15 (2020).
Saatci, Newly developed methods for SARS-CoV-2 detection [SARS-CoV-2 saptanmasinda yeni gelistririlen tani yontemleri], Turk J. Biochem., 45 (5), pp. 465-474 (2020).
Vasco et al., "Macrocyclization of Peptide Side Chains by the Ugi Reaction: Achieving Peptide Folding and Exocyclic N-Functionalization in One Shot", Journal of Organic Chemistry, 80, pp. 6697-6707 (2015).
Xiang et al., "A novel double antibody sandwich-lateral flow immunoassay for the rapid and simple detection of hepatitis C virus", International Journal of Molecular Medicine, 30, pp. 1041-1047 (2012).
Examination Report received in European Patent Application No. 18 718 922.0 dated May 20, 2022.

\* cited by examiner

NOZZLE FOR 3D BIOPRINTING

CROSS-REFERENCE TO RELATED APPLICATIONS

This application claims benefit of priority of U.S. Provisional Patent Application No. 63/067,958 entitled, "NOZZLE AND PRINT STAGE FOR ADVANCED 3D BIOPRINTING" filed Aug. 20, 2020. The entire contents and disclosure of this patent application is incorporated herein by reference in its entirety.

This application makes reference to U.S. Provisional Patent Application No. 63/067,913 entitled, "PEPTIDE COMPOUND WITH REPETITIVE SEQUENCES" filed Aug. 20, 2020, and U.S. patent application Ser. No. 17/401,434 entitled, "PEPTIDE COMPOUND WITH REPETITIVE SEQUENCES" filed Aug. 13, 2021. The entire contents and disclosures of these patent applications are incorporated herein by reference.

BACKGROUND

Field of the Invention

The present disclosure relates to generally to a device comprising a coaxial nozzle for building a 3D tissue model.

Background of the Invention 3D printing technologies can be applied to build tissue-like structures, e.g. in the field of medicine and tissue engineering. Generally, these methods are referred to as 3D bioprinting. In 3D bioprinting, usually a pre-polymer viscous solution and living cells are used to print in 3D. The mechanical properties and cell viabilities are important factors in order for the 3D structures to be functional. Existing 3D bioprinting devices have drawbacks, such as low cell viability and resolution, clogging of bioinks during printing, leakage, etc. Therefore, despite recent advances in 3D bioprinting, there is still a need for improved devices for printing of 3D objects.

SUMMARY

According to first broad aspect, the present disclosure provides a coaxial nozzle for bioprinting 3D tissue model.

According to another broad aspect, the present disclosure provides a nozzle for 3D tissue bioprinting comprising: at least one buffer solution inlet; at least one peptide inlet; at least one cell inlet; and a mixing chamber, wherein the at least one buffer solution inlet is attached to the at least one peptide inlet, and wherein the at least one cell inlet is attached to the at least one peptide inlet.

According to yet another broad aspect, the present disclosure provides a nozzle for 3D tissue bioprinting comprising: at least one buffer solution inlet; at least one peptide inlet; at least one cell inlet; and a mixing chamber, wherein the at least one buffer solution inlet is attached from a side of the at least one peptide inlet, and wherein the at least one cells inlet is disposed externally and attached at an angle to the at least one peptide inlet.

In one described embodiment, the nozzle comprises four inlets, one outlet, a mixing chamber that allows for the peptide bioink to form. The four inlets may include two PBS inlets, a peptide inlet and at least one cell inlet. The two PBS (phosphate-buffered saline) inlets may include tubings which may be attached on opposite sides of the peptide inlet for a dual PBS flow. This configuration facilitates continuous gelation of the peptide. Moreover, Luer locks may be utilized for providing secure tube attachment and management thereof. The cell inlet may be placed externally and attached at an angle in order to delay the mixing of cells with the peptide hydrogel until the bioink is completely and homogeneously formed.

In another embodiment, the nozzle comprises two peptide inlets, a PBS inlet and at least one cell inlet, with the peptide inlets attached on opposite sides of the PBS inlet.

In accordance with disclosed embodiments, this design promotes cell viability and allows for consistent extrusion of cells into the construct. The PBS inlet and peptide inlet may be arranged in different ratios or configurations according to the viscosity of the bioink and the parameters needed.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE INVENTION

Definitions

Figure 1:
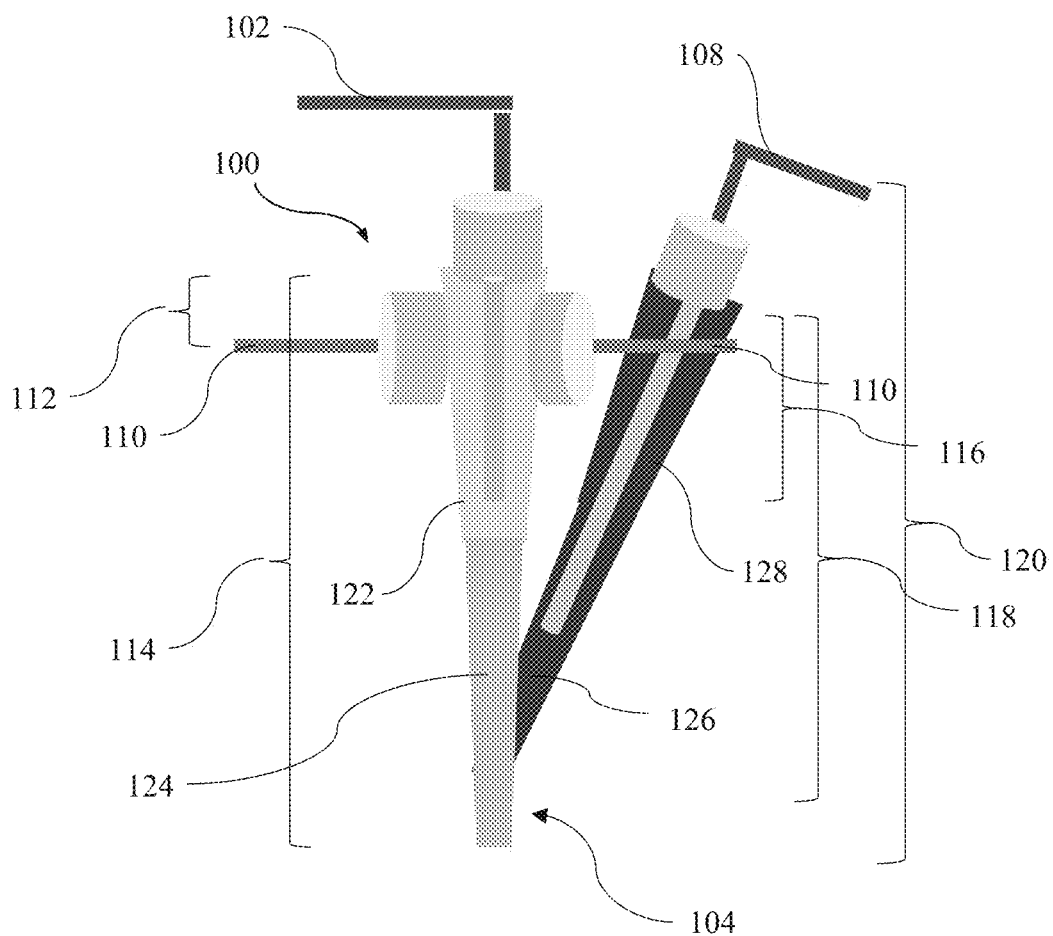
FIG. 1 illustrates an exemplary structure of a nozzle according to an embodiment of the present disclosure.

Where the definition of terms departs from the commonly used meaning of the term, applicant intends to utilize the definitions provided below, unless specifically indicated.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

For purposes of the present disclosure, the term "comprising", the term "having", the term "including," and variations of these words are intended to be open-ended and mean that there may be additional elements other than the listed elements.

For purposes of the present disclosure, directional terms such as "top," "bottom," "upper," "lower," "above," "below," "left," "right," "horizontal," "vertical," "up," "down," etc., are used merely for convenience in describing the various embodiments of the present disclosure. The embodiments of the present disclosure may be oriented in various ways. For example, the diagrams, apparatuses, etc., shown in the drawing figures may be flipped over, rotated by 90° in any direction, reversed, etc.

For purposes of the present disclosure, a value or property is "based" on a particular value, property, the satisfaction of a condition, or other factor, if that value is derived by performing a mathematical calculation or logical decision using that value, property or other factor.

For purposes of the present disclosure, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For purposes of the present disclosure, the term "bioink" refers to materials used to produce engineered/artificial tissue using 3D printing. These inks may be composed of the cells that are being used, but may also be utilized in tandem with additional materials that envelope the cells. The combination of cells and usually biopolymer gels may be defined as a bioink. Bioink may include certain characteristics such as those including: rheoligical properties, physico-mechanical properties, biofunctionality, and biocompatibility. The disclosed bioink may include a hydrogel biomaterial that may be extruded through a printing nozzle or needle into filaments that may maintain shape fidelity after deposition. Disclosed bioinks may maintain the viability of cells blended within the bioinks during and after the printing process. The cells may be from a biological specimen.

For purposes of the present disclosure, the term "biological sample" and the term "biological specimen" refers to either a part or the whole of a human, vertebrate animal, invertebrate animal, microbe or plant in vitro or in vivo. The term includes but is not limited to material of human, vertebrate animal, invertebrate animal, microbe or plant origin such as human, animal, microbial or plant tissue sections, cell or tissue cultures, suspension of human, vertebrate animal, invertebrate animal, microbial or plant cells or isolated parts thereof, human or animal biopsies, blood samples, cell-containing fluids and secretion.

For purposes of the present disclosure, the term "biocompatible materials" refers to natural or synthetic materials that are suitable for introduction into living tissue. Such materials may be used, for example, as part of or in devices interacting with biological systems such as for a medical purpose including medical devices.

For purposes of the present disclosure, the term "biological sample" and the term "biological specimen" refers to either a part or the whole of a human, vertebrate animal, invertebrate animal, microbe or plant in vitro or in vivo. The term includes but is not limited to material of human, vertebrate animal, invertebrate animal, microbe or plant origin such as human, animal, microbial or plant tissue sections, cell or tissue cultures, suspension of human, vertebrate animal, invertebrate animal, microbial or plant cells or isolated parts thereof, human or animal biopsies, blood samples, cell-containing fluids and secretion.

For purposes of the present disclosure, the term "construct" and "3D construct" are used interchangeably. These terms refer to the structure formed after the bioinks flows out of the nozzle.

For the purpose of present disclosure, the term "Luer locks" refers to connectors that are joined by means of a tabbed hub on the female fitting that screws into threads in a sleeve on the male fitting and attaches securely. They may be screw connections on a syringe that creates a leak-free seal.

For purposes of the present disclosure, the term "nozzle" refers to a device designed to control the direction or characteristics of bioinks as it exits an enclosed chamber or pipe connected to a bioprinter. In some embodiments, the disclosed nozzle may be configured to receive, for example, on or more materials (such as a buffer solution, ultra-short peptide and cells) which are mixed and then spouted out of an outlet of the nozzle in order to build a 3D tissue model.

For purposes of the present disclosure, the term "needle" refers to a non-flexible tubing structure with an outer diameter. In an exemplary embodiment, the outer diameter may be 0.8-1.2 mm.

For purposes of the present disclosure, the term "PBS" refers to a buffer solution commonly used in biological research, which is an abbreviation of phosphate-buffered saline. It is a water-based salt solution, helping to maintain a constant pH, as well as osmolarity and ion concentrations to match those of most cells. In some embodiments, PBS may include a water-based salt solution containing disodium hydrogen phosphate, sodium chloride and, in some formulations, potassium chloride and potassium dihydrogen phosphate.

For purposes of the present disclosure, the term "peptide" refers to and is used interchangeably with "ultra-short peptide" and "self-assembling peptide". These terms may refer to a sequence containing 3-7 amino acids. The peptides according an aspect of the present disclosure are also particularly useful for formulating aqueous or other solvent compositions, herein also sometimes referred to as "inks" or "bioinks," which may be used for printing structures, in particular 3D structures. Such printed structures make use of the gelation properties of the peptides according to features of the present disclosure.

Description

While the invention is susceptible to various modifications and alternative forms, specific embodiment thereof has been shown by way of example in the drawings and will be described in detail below. It should be understood, however, that it is not intended to limit the invention to the particular forms disclosed, but on the contrary, the invention is to cover all modifications, equivalents, and alternatives falling within the spirit and the scope of the invention.

According to first broad aspect, the present disclosure provides a coaxial nozzle for bioprinting 3D tissue model.

Turning to FIG. 1, a nozzle 100 is shown in accordance with an embodiment of the present disclosure. In one embodiment, nozzle 100 may comprise multiple inlets (102, 108 and 110) and one outlet 104, as shown in FIG. 1.

In one disclosed embodiment nozzle 100 may comprise multiple inlets (102, 108 and 110) and an outlet 104. In one disclosed embodiment, the multiple inlets (102, 108 and 110) may comprise a peptide inlet 102, a cell inlet 108 and two PBS inlets 110. Cell inlet 108 may receive one or more cells therein. In one preferred embodiment, nozzle 100 also comprises a mixing chamber 122 that allows for the peptide bioink to form. In one disclose configuration, PBS inlets 110 (buffer solution inlets) may be attached from a side of peptide inlet 102. In addition, cells inlet 108 may be disposed externally and attached at an angle to peptide inlet 102. While the drawings illustrate at least one peptide inlet 102, cell inlet 108 and PBS inlet 110, it is readily appreciated that more than one of the same and combinations thereof may be provided within disclosed embodiments of nozzle 100.

In one embodiment, the self-assemble ultrashort peptides that is compatible with the peptide inlet 102 have composition of amino acids A, B, X, such as $A_nB_mX$ or $B_mA_nX$ or $XA_nB_m$ or $XB_mA_n$ wherein the total number of amino acids of the ultrashort peptide does not exceed 7 amino acids; wherein A are comprised of aliphatic, i.e., non-aromatic, hydrophobic amino acids, selected from the group of aliphatic amino acids, such as isoleucine and leucine, with n being an integer being selected from 0-5; wherein B are comprised of one aromatic amino acid, such as tyrosine, tryptophan, or phenylalanine, preferably the hydrophobic amino acid phenylalanine, or comprised of a peptidomimetic amino acid that is the aliphatic counterpart of the aromatic amino acid, such as cyclohexylalanine, which is the counterpart of amino acid phenylalanine with m being an integer being selected from 0-3; wherein X is comprised of a polar amino acid, selected from the group of aspartic acid, glutamic acid, lysine, arginine, histidine, cysteine, serine, threonine, asparagine, and glutamine.

Such peptides have gelation properties. In other words, the peptides gelatinize after a certain amount of time when mixed in buffer solutions, such as PBS. To avoid early gelation in the tubings and/or clogging of the tubings, it is preferred the mixing of peptides and the buffer solution occurs within the nozzle close to the outlet. On the other hand, to avoid insufficient mixing, it is preferred that the mixing of peptides and the buffer solution occurs within the nozzle at some distance away from the outlet. Therefore, the nozzle is designed to have a mixing chamber, in which the peptides and the buffer solution can be sufficiently mixed, but gelation is not fully formed until the peptide mixture reaches the outlet. The suitable distance between the mixing chamber and the outlet depends on the gelation time of the peptide mixture, which is determined by the type and the concentration of the peptide, the temperature, and the type of buffer solution. In one embodiment the mixing of peptides and the buffer solution occurs in the mixing chamber, which is 3-6 mm away from the outlet.

In one embodiment, the two PBS inlets 110 may comprise tubings attached on opposite ends from either side of the nozzle for a dual PBS flow, which facilitates continuous gelation of the peptide. Moreover, lock fasteners such as Luer locks may be utilized to for securing the tube attachment and management thereof. The cells inlet 108 is placed externally and attached to the PBS needle 124 at an angle such that the tip of the cell inlet is approximately 5 mm above the tip of the nozzle, in order to delay the mixing of cells with the peptide hydrogel until the bioink is completely and homogeneously formed. Furthermore, the angle also ensures that the luer lock attachment does not collide with the other inlets. This design promotes cell viability and allows for consistent extrusion of cells into the construct.

In one disclosed embodiment, the distance between the peptide inlet 102 and PBS inlets 110 is approximately 7.32 mm (112), between the peptide inlet 102 and the outlet 104 is approximately 40-45 mm (114), the length of the cell chamber 128 is approximately 18-20 mm (116), the distance between the cells inlet 108 and the bottom of cells needle 126 is approximately 45-50 mm (118) and the overall length of the nozzle is approximately 50-60 mm (120).

In another embodiment, the PBS inlet and peptide inlet can be arranged in different ratios or configurations according to the viscosity of the bioink and the parameters needed.

Figure 2:
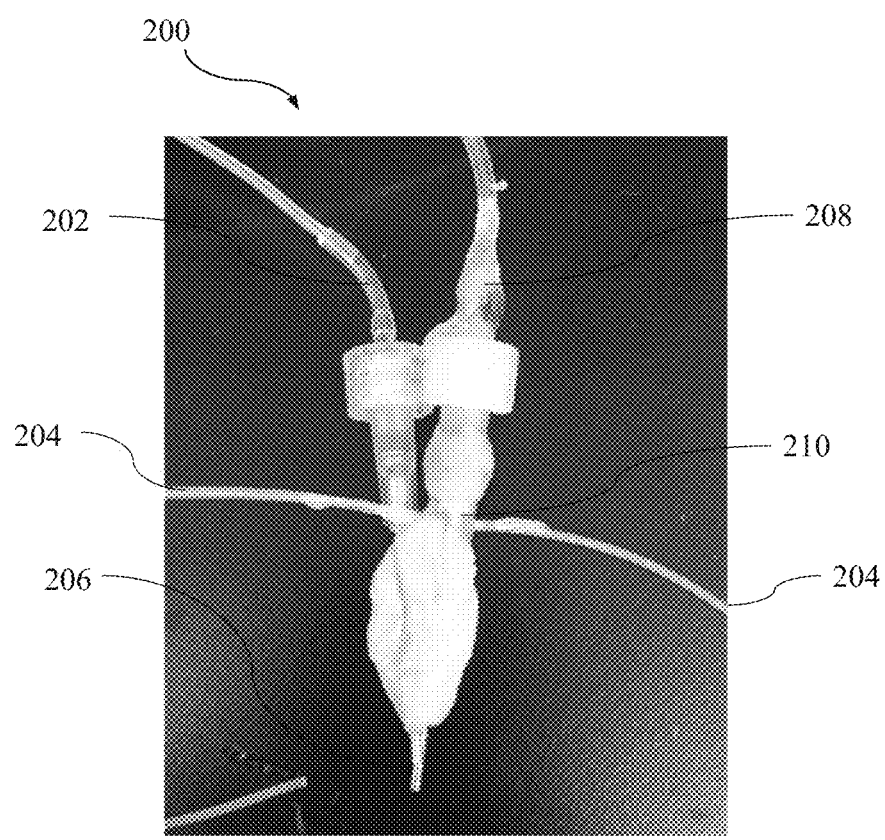
FIG. 2 illustrates a nozzle prototype with multiple inlets and an outlet according to an embodiment of the present disclosure.

FIG. 2 illustrates another nozzle prototype with multiple inlets and an outlet according to an embodiment of the present disclosure. Thus, in one embodiment nozzle 200 may comprise multiple inlets (202, 204 and 208) and an outlet 206. The multiple inlets (202, 204 and 208) may comprise a peptide inlet 208, two PBS inlets 204, and a cell inlet 202. Cell inlet 202 may receive one or more cells therein. While the drawings illustrate at least one peptide inlet 208, PBS inlet 204 and cell inlet 202, it is readily appreciated that more than one of the same and combinations thereof may be provided within disclosed embodiments of nozzle 200. In one preferred embodiment, nozzle 200 also comprises a mixing chamber 210 that allows for the peptide bioink to form therein.

In another embodiment nozzle 200 may comprise multiple inlets (202, 204 and 208) and an outlet 206. The multiple inlets (202, 204 and 208) may comprise a peptide inlet 204, two PBS inlets 208, and a cell inlet 202. Cell inlet 202 may receive one or more cells therein. While the drawings illustrate at least one peptide inlet 204, PBS inlet 208 and cell inlet 202, it is readily appreciated that more than one of the same and combinations thereof may be provided within disclosed embodiments of nozzle 200. In one preferred embodiment, nozzle 200 also comprises a mixing chamber 210 that allows for the peptide bioink to form therein.

Figure 3:
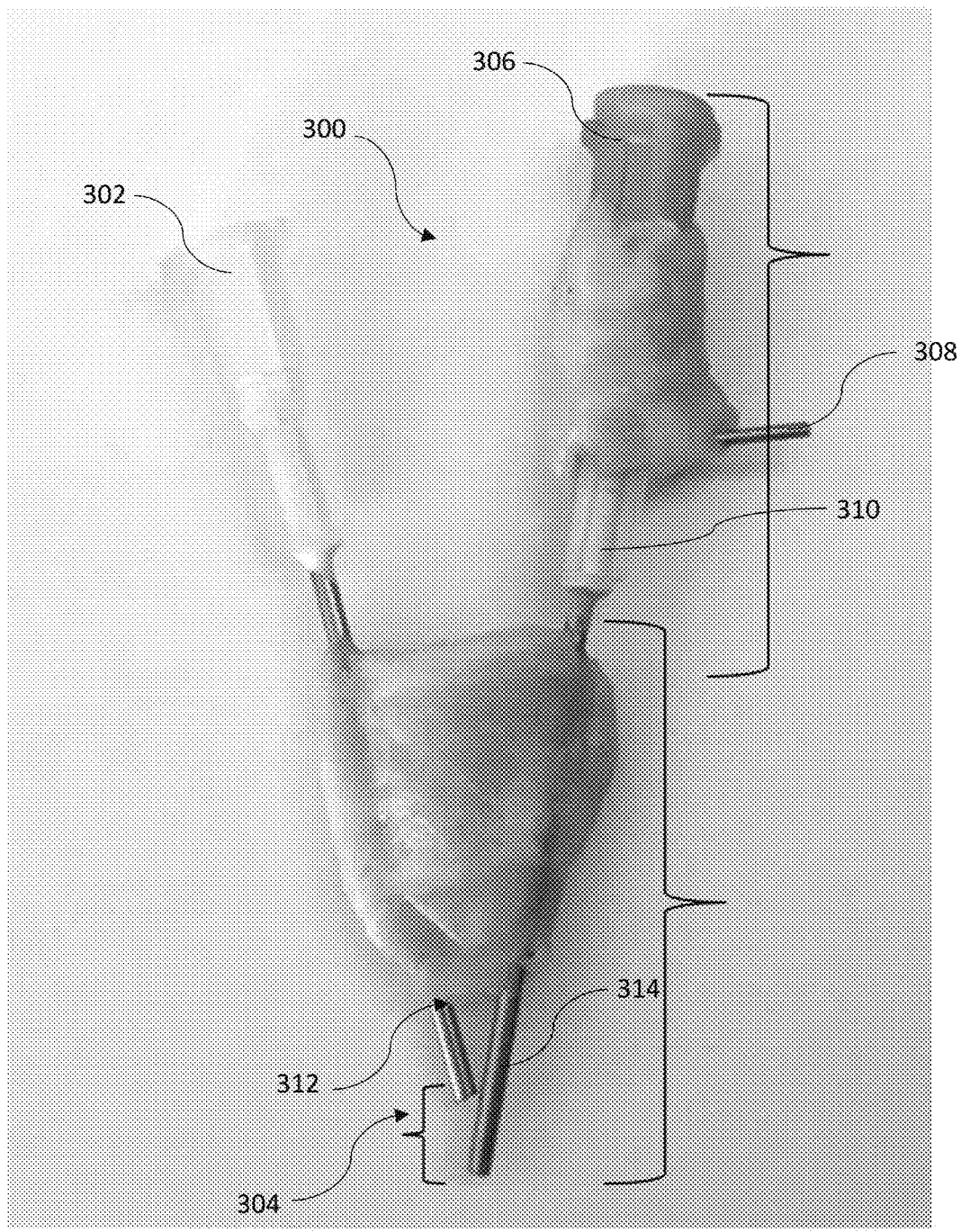
FIG. 3 illustrates a nozzle prototype having a plurality of inlets and an outlet according to an embodiment of the present disclosure.

FIG. 3 illustrates another exemplary nozzle prototype having a plurality of inlets and an outlet according to an embodiment of the present disclosure. Thus, nozzle 300 may comprise multiple inlets (302, 306 and 308) and an outlet 304. The multiple inlets (302, 306 and 308) may include a cell inlet (302), a peptide inlet (306) and a PBS inlet (308). Cell inlet 302 may receive one or more cells therein. While the drawings illustrate at least one cell inlet 302, peptide inlet 306 and PBS inlet 308, it is readily appreciated that more than one of the same and combinations thereof may be provided within disclosed embodiments of nozzle 300.

In one embodiment, nozzle 300 also comprises a mixing chamber (310) that allows for the peptide bioink to form therein. The bottom of the cell inlet 302 may terminate at a cell needle 312. The bottom of the cell needle 312 may terminate at the PBS needle 314. The bottom of the peptide inlet 306 and PBS inlet 308 may terminate at a peptide and PBS needle 314. In one preferred embodiment, the bottom of the cell needle (312) may be disposed approximately 5 mm above the bottom of the peptide and PBS needle (314); the outer diameter (OD) of the needles may be approximately 0.8-1.2 mm; the length of the needles may be approximately 28-32 mm; and the mixing chamber (310) may be approximately 25-30.2 mm, as shown in FIG. 3.

In another embodiment, nozzle 400 may comprise multiple inlets (402, 406 and 408) and an outlet 404. The multiple inlets (402, 406 and 408) may include a cell inlet (402), a peptide inlet (408) and a PBS inlet (406). Cell inlet 402 may receive one or more cells therein. While the drawings illustrate at least one cell inlet 402, peptide inlet 408 and PBS inlet 406, it is readily appreciated that more than one of the same and combinations thereof may be provided within disclosed embodiments of nozzle 400.

Figure 4:
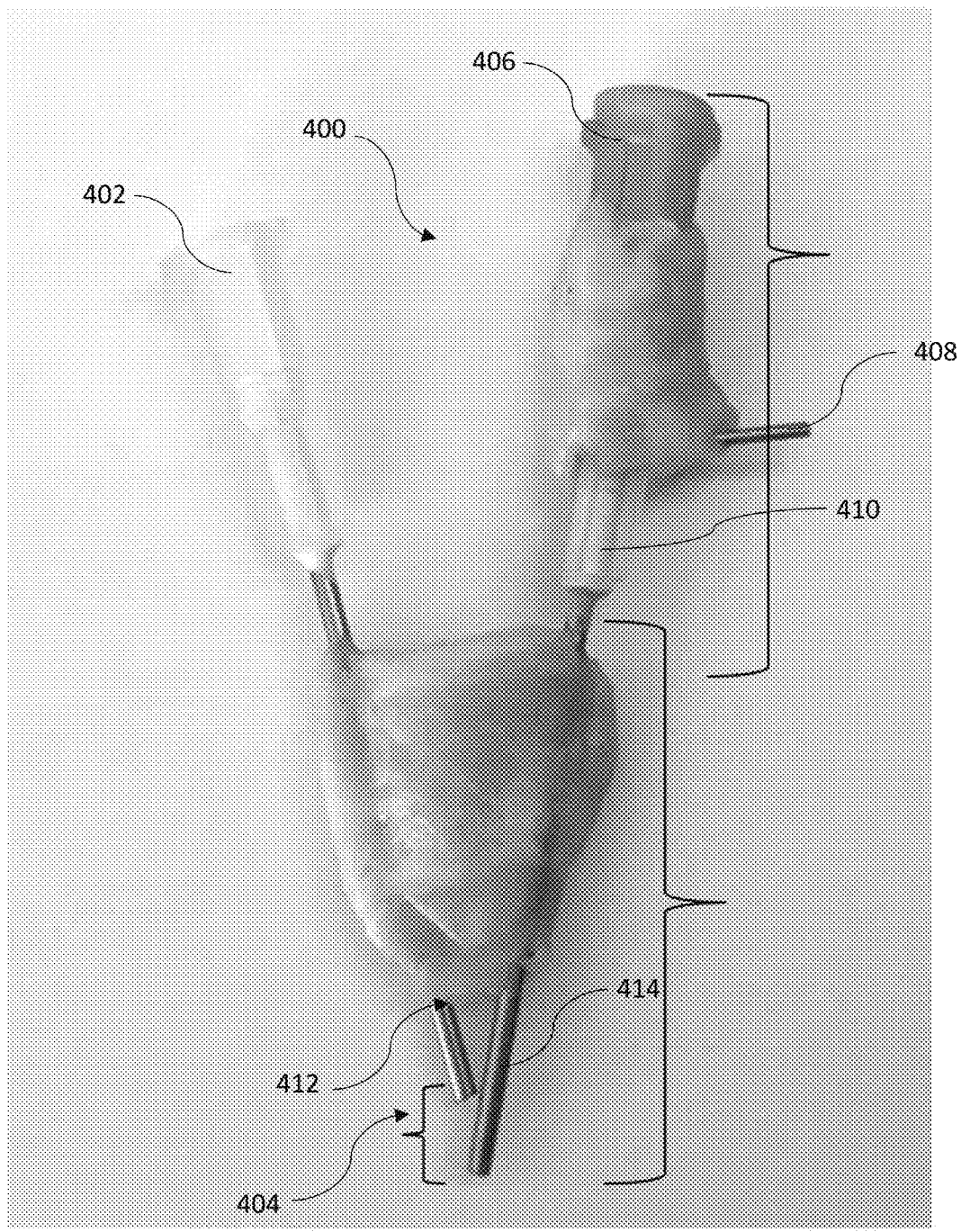
FIG. 4 illustrates a nozzle prototype having a plurality of inlets and an outlet with different configuration of the PBS and peptide inlets from that shown in FIG. 3 according to an embodiment of the present disclosure.

In another embodiment, nozzle 400 also comprises a mixing chamber (410) that allows for the peptide bioink to form therein. The bottom of the cell inlet 402 may terminate at a cell needle 412. The bottom of the cell needle 412 may terminate at the PBS needle 414. The bottom of the peptide inlet 408 and PBS inlet 406 may terminate at a peptide and PBS needle 414. In one preferred embodiment, the bottom of the cell needle (412) may be disposed approximately 5 mm above the bottom of the peptide and PBS needle (414); the outer diameter (OD) of the needles may be approximately 0.8-1.2 mm; the length of the needles may be approximately 28-32 mm; and the mixing chamber (410) may be approximately 25-30.2 mm, as shown in FIG. 4.

Having described the many embodiments of the present disclosure in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

What is claimed is:

1. A nozzle for 3D tissue bioprinting comprising:
at least one buffer solution inlet;
at least one peptide inlet;
at least one cell inlet;
a buffer needle;
a cell needle; and
a mixing chamber,
wherein the at least one buffer solution inlet is attached to the at least one peptide inlet,
wherein the at least one cell inlet attaches to the cell needle from a top of the cell needle,
wherein the at least one buffer solution inlet and at least one peptide inlet are attached to the buffer needle from a top of the buffer needle through the mixing chamber, and
wherein the cell needle is attached externally at an angle to the buffer needle,
wherein a bottom of the at least one cell inlet terminates at the cell needle and a bottom of the at least one peptide inlet and the at least one buffer solution inlet terminate at the buffer needle, wherein a bottom of the cell needle is disposed approximately 3-7 mm above a bottom of the buffer needle.

2. The nozzle for 3D tissue bioprinting of claim 1, wherein the at least one buffer solution inlet is attached from a side of the at least one peptide inlet.

3. The nozzle for 3D tissue bioprinting of claim 1, wherein a locking mechanism attaches tubes to the at least one buffer solution inlet, at least one peptide inlet and at least one cell inlet.

4. The nozzle for 3D tissue bioprinting of claim 3, wherein the locking mechanism is a Luer lock.

5. The nozzle for 3D tissue bioprinting of claim 1, wherein a buffer solution compatible with the at least one buffer solution inlet is phosphate-buffered saline (PBS).

6. The nozzle for 3D tissue bioprinting of claim 1 comprises two buffer solution inlets, wherein the two buffer solution inlets are attached on opposite ends from either side of the at least one peptide inlet.

7. The nozzle for 3D tissue bioprinting of claim 1, wherein the angle at which the cell needle is attached to the buffer needle is approximately 40-80 degrees.

8. The nozzle for 3D tissue bioprinting of claim 1, wherein the angle at which the at least one cell inlet is attached to the at least one peptide inlet is approximately 80 degrees.

9. The nozzle for 3D tissue bioprinting of claim 1, wherein a length of the nozzle is approximately 50-60 mm.

10. The nozzle for 3D tissue bioprinting of claim 1, wherein a length of the nozzle is approximately 55 mm.

11. The nozzle for 3D tissue bioprinting of claim 1, wherein an outer diameter (OD) of the cell needle is approximately 0.9-1.8 mm, and an OD of the buffer needle is approximately 0.8-1.2 mm.

12. The nozzle for 3D tissue bioprinting of claim 1, wherein the buffer needle comprises a peptide and phosphate-buffered saline (PBS) needle.

13. A nozzle for 3D tissue bioprinting comprising:
at least one buffer solution inlet;
at least one peptide inlet;
at least one cell inlet;
a buffer needle;
a cell needle; and
a mixing chamber,
wherein the at least one buffer solution inlet is attached from a side of the at least one peptide inlet,
wherein the at least on cell inlet attaches to the cell needle from a top of the cell needle,
wherein the at least one buffer solution inlet and the at least one peptide inlet are attached to the buffer needle from a top of the buffer needle through the mixing chamber, and
wherein the at least one cell inlet is disposed externally and attached at an angle to the at least one peptide inlet,
wherein a bottom of the at least one cell inlet terminates at the cell needle and a bottom of the at least one peptide inlet and the at least one buffer solution inlet terminate at the buffer needle, wherein a bottom of the cell needle is disposed approximately 3-7 mm above a bottom of the buffer needle.

14. The nozzle for 3D tissue bioprinting of claim 13, wherein a locking mechanism attaches tubes to the at least one buffer solution inlet, at least one peptide inlet and at least one cell inlet.

15. The nozzle for 3D tissue bioprinting of claim 14, wherein the locking mechanism is a Luer lock.

16. The nozzle for 3D tissue bioprinting of claim 13, wherein a buffer solution compatible with the at least one buffer solution inlet is phosphate-buffered saline (PBS).

17. The nozzle for 3D tissue bioprinting of claim 13 comprises two buffer solution inlets, wherein the two buffer solution inlets are attached on opposite ends from either side of the at least one peptide inlet.

18. The nozzle for 3D tissue bioprinting of claim 13, wherein the angle at which the cell needle is attached to the buffer needle is approximately 40-80 degrees.

19. The nozzle for 3D tissue bioprinting of claim 13, wherein a length of the nozzle is approximately 50-60 mm.

20. The nozzle for 3D tissue bioprinting of claim 13, wherein an outer diameter (OD) of the cell needle is approximately 0.9-1.8 mm, and an OD of the buffer needle is approximately 0.8-1.2 mm.

21. The nozzle for 3D tissue bioprinting of claim 13, wherein the buffer needle comprises a peptide and phosphate-buffered saline (PBS) needle.

* * * * *